US012707219B2

(12) United States Patent
Agrawal et al.

(10) Patent No.: US 12,707,219 B2
(45) Date of Patent: Aug. 11, 2026

(54) ELECTRONIC SYSTEM WITH EARPHONE/HEADPHONE RECOMMENDATION BASED ON EXPECTED CONTEXT OF DAILY USAGE OF WEARABLE AUDIO OUTPUT DEVICE(S)

(71) Applicant: MOTOROLA MOBILITY LLC, Wilmington, DE (US)

(72) Inventors: Amit Kumar Agrawal, Bangalore (IN); Krishnan Raghavan, Bangalore (IN)

( * ) Notice: Subject to any disclaimer, the term of this patent is extended or adjusted under 35 U.S.C. 154(b) by 179 days.

(21) Appl. No.: 18/614,690

(22) Filed: Mar. 24, 2024

(65) Prior Publication Data

US 2025/0301274 A1 Sep. 25, 2025

(51) Int. Cl.
*H04S 7/00* (2006.01)
*G06Q 10/109* (2023.01)
*G06Q 30/0251* (2023.01)

(52) U.S. Cl.
CPC ............. *H04S 7/30* (2013.01); *G06Q 10/109* (2013.01); *G06Q 30/0251* (2013.01)

(58) Field of Classification Search
CPC ......... G06F 16/68; G06F 16/60; G06F 3/0482
USPC ........................................................... 700/94
See application file for complete search history.

(56) References Cited

U.S. PATENT DOCUMENTS 10,296,954 B1 * 5/2019 Mishra .............. G06Q 30/0641
2008/0235853 A1 10/2008 Sousa
2014/0193001 A1 * 7/2014 Oishi ................ G06Q 30/0631 381/101
2019/0245635 A1 * 8/2019 Verkasalo ............. H04H 60/58
2022/0109932 A1 4/2022 Felton et al.
2022/0150617 A1 5/2022 Backe
2022/0217462 A1 7/2022 Panecki et al.
2023/0247340 A1 8/2023 Lee
2023/0254629 A1 * 8/2023 Ishibashi ............. H04R 1/1058 381/71.6
2024/0098607 A1 * 3/2024 Srinivasan ........... H04W 36/32
2024/0373181 A1 * 11/2024 Lundbäck ............... G01H 3/14
2025/0029632 A1 1/2025 Park et al.

FOREIGN PATENT DOCUMENTS

CN 108270913 A 7/2018
CN 110764730 A 2/2020

* cited by examiner

*Primary Examiner* — Alexander Krzystan
(74) *Attorney, Agent, or Firm* — Isidore PLLC

(57) ABSTRACT

An electronic device, method and computer program product provide recommendations for a wearable audio output device that is appropriate for a scheduled use. A controller of the electronic device determines, based on schedule data, a context (e.g., sound quality and volume level of ambient sound) of presentation of audio output via wearable audio output device(s). The controller associates, for each wearable audio output device, a respective ambient sound attenuation value compatible with a range of sound quality and volume level of the context. The controller identifies a candidate wearable audio output device that has an associated ambient sound attenuation value that is compatible with the context of presentation. The controller presents, via an output device, a recommendation to have the candidate wearable audio output device available to successfully present the audio output for the context of presentation of the audio output during a scheduled time.

20 Claims, 7 Drawing Sheets

| Wearable Audio Output Device | Air Leakage (between 0° – 100°) | Sound Attenuation (between 0° – 100°) | Sound Quality (between 0° – 100°) |
|---|---|---|---|
| A 306a | 5% | 30% | 35% |
| B 306b | Right Ear:: 50%<br>Left Ear: 100% | Right Ear: 50%<br>Left Ear: 0% | Right Ear: 55%<br>Left Ear: 0% |
| C 306c | 60% | 80% | 90% |

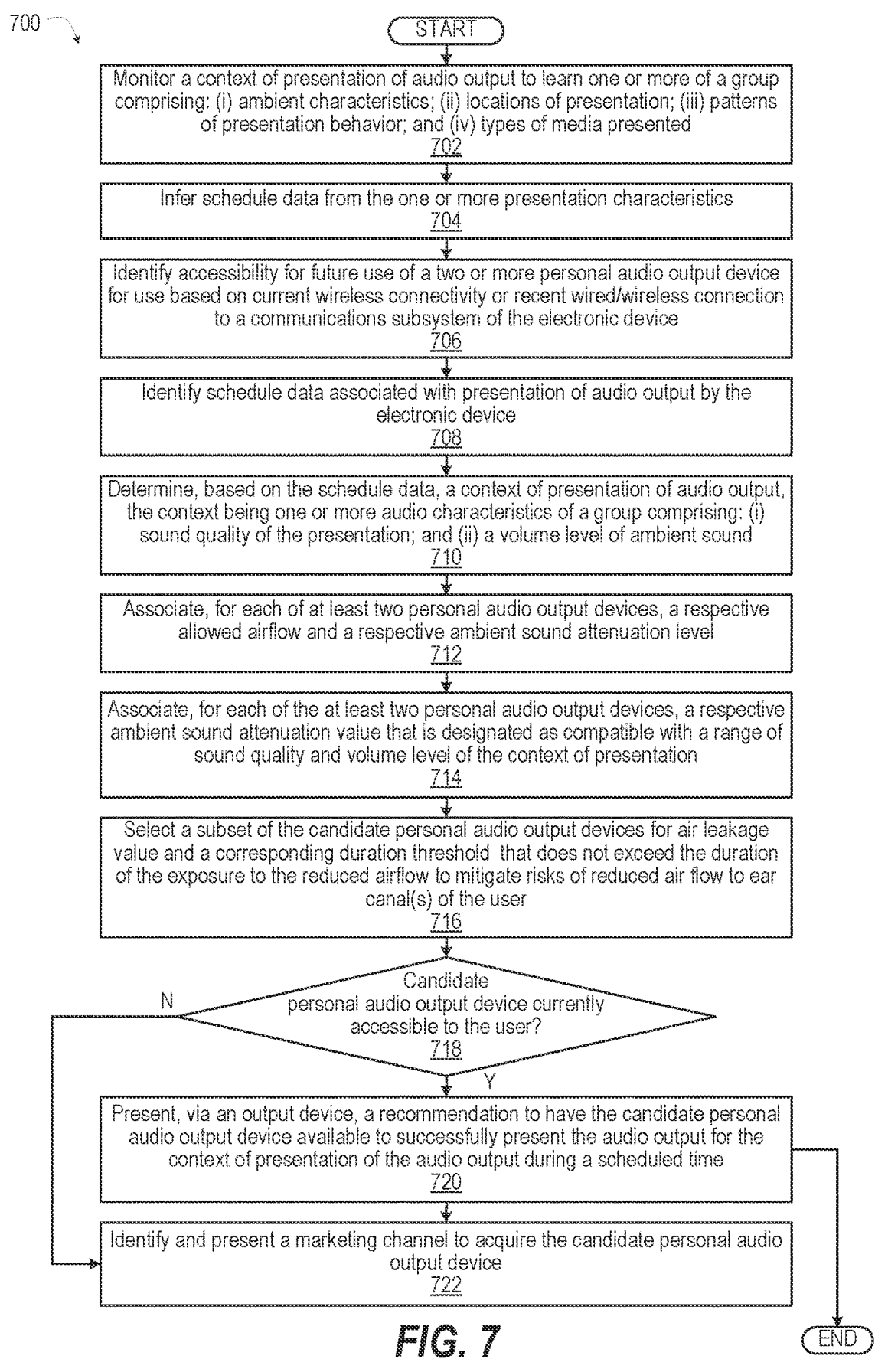

700

START

Monitor a context of presentation of audio output to learn one or more of a group comprising: (i) ambient characteristics; (ii) locations of presentation; (iii) patterns of presentation behavior; and (iv) types of media presented
702

Infer schedule data from the one or more presentation characteristics
704

Identify accessibility for future use of a two or more personal audio output device for use based on current wireless connectivity or recent wired/wireless connection to a communications subsystem of the electronic device
706

Identify schedule data associated with presentation of audio output by the electronic device
708

Determine, based on the schedule data, a context of presentation of audio output, the context being one or more audio characteristics of a group comprising: (i) sound quality of the presentation; and (ii) a volume level of ambient sound
710

Associate, for each of at least two personal audio output devices, a respective allowed airflow and a respective ambient sound attenuation level
712

Associate, for each of the at least two personal audio output devices, a respective ambient sound attenuation value that is designated as compatible with a range of sound quality and volume level of the context of presentation
714

Select a subset of the candidate personal audio output devices for air leakage value and a corresponding duration threshold that does not exceed the duration of the exposure to the reduced airflow to mitigate risks of reduced air flow to ear canal(s) of the user
716

Candidate personal audio output device currently accessible to the user?
718

N

Y

Present, via an output device, a recommendation to have the candidate personal audio output device available to successfully present the audio output for the context of presentation of the audio output during a scheduled time
720

Identify and present a marketing channel to acquire the candidate personal audio output device
722

END

*FIG. 7*

ELECTRONIC SYSTEM WITH EARPHONE/HEADPHONE RECOMMENDATION BASED ON EXPECTED CONTEXT OF DAILY USAGE OF WEARABLE AUDIO OUTPUT DEVICE(S)

BACKGROUND

1. Technical Field

The present disclosure relates generally to electronic devices that present audio output, and more particularly, to electronic devices that present the audio output via audio output devices in direct contact with ear(s) of a user.

2. Description of the Related Art

Over the past decade, wearable audio devices have witnessed an exponential surge in user adoption. From the introduction of Bluetooth earpieces to the widespread popularity of true wireless earphones and smart headphones, these audio devices have become integral to daily life. The convenience, portability, and advancements in audio technology have fueled this trend. Users now often own multiple wearable audio devices, catering to various needs such as fitness, leisure, and work. These devices seamlessly integrate with an array of computing gadgets-smartphones, tablets, laptops, and smartwatches-creating a unified audio ecosystem. Bluetooth connectivity allows effortless pairing across devices, enabling users to switch between devices without interruptions. The rise of voice assistants like Siri, Alexa, and Google Assistant has further amplified the utility of these wearables, transforming the voice assistants into smart hubs for managing tasks, receiving notifications, and controlling other connected devices. As people increasingly embrace a multitasking lifestyle, the demand for wearable audio technology continues to soar, fostering innovation and enhancing the way users interact with their digital environments.

Continuous use of earphones carries substantial risks to hearing health. Prolonged exposure to high decibel audio levels can lead to potential hearing loss and various ear-related issues. In an example, moisture and limited ventilation caused by earphone use create an environment ripe for bacterial growth, elevating the risk of infections like otitis externa. This condition, characterized by inflammation and potential bacterial or fungal development, poses significant discomfort and health risks. Additionally, the constant pressure and friction from earphone buds can irritate the delicate ear canal, causing itching, discomfort, and even abrasions. While over-the-ear headphones distribute pressure differently, improper hygiene and extended use can still contribute to similar problems. Users, often enamored with the convenience, overlook the cumulatively negative impact on their hearing.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which:

FIG. 7 is a flow diagram of a method of a method of recommending an appropriate wearable audio output device for a context of scheduled use, according to one or more embodiments;

DETAILED DESCRIPTION

Figure 1:
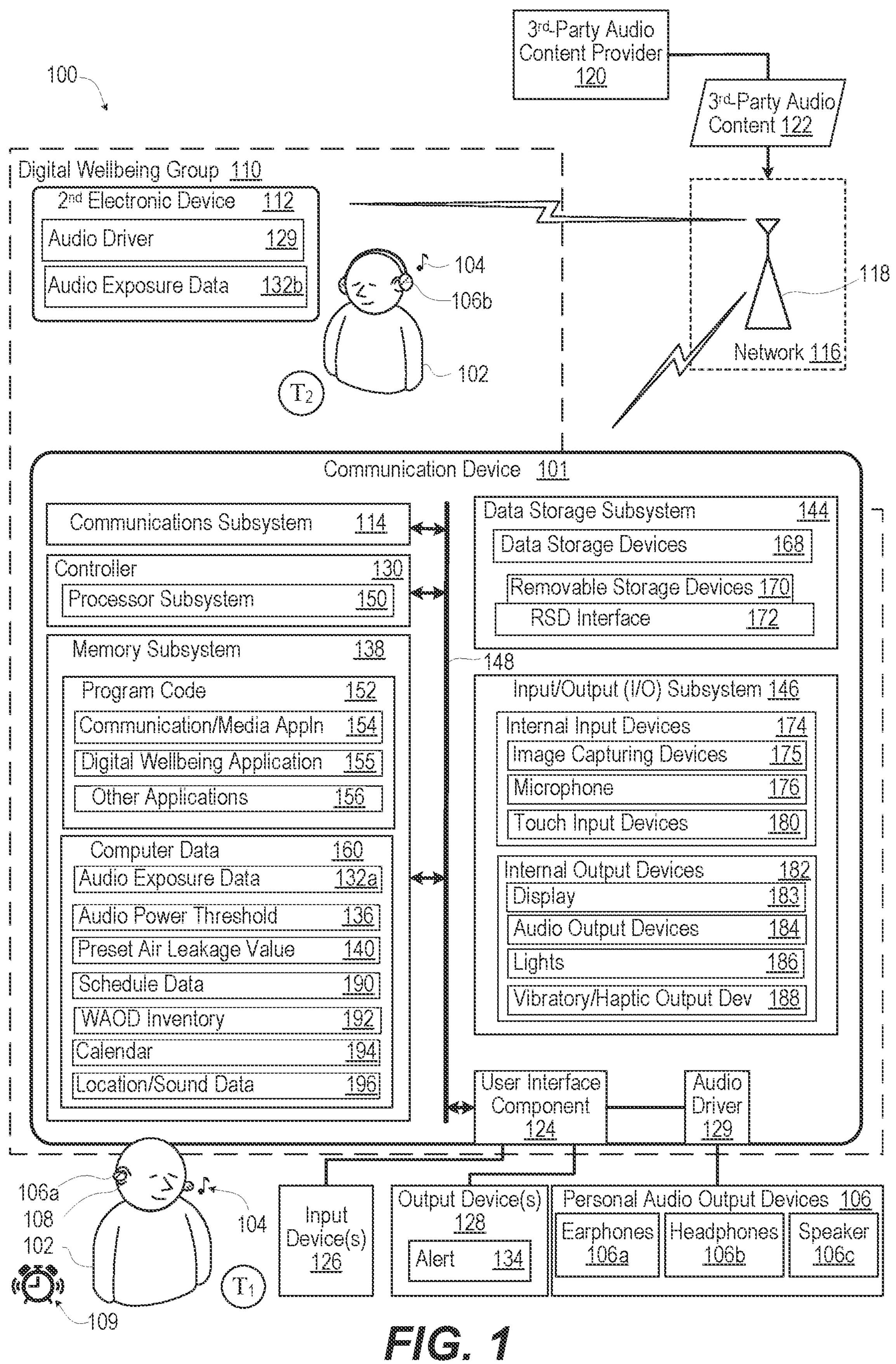
FIG. 1 presents a functional block diagram of an example electronic device that performs digital wellbeing management based on duration of using wearable audio output devices, according to one or more embodiments.

According to aspects of the present disclosure, an electronic system, a method, and a computer program product provide recommendations for a wearable audio output device that is appropriate for a scheduled output of audio content from an electronic device. In one or more embodiments, the electronic device includes an audio driver that is configured to communicatively couple serially to at least two wearable audio output devices, each having a different allowed airflow and ambient sound attenuation level. A controller of the electronic device is communicatively coupled to the audio driver. The controller identifies schedule data associated with presentation of audio output. The controller determines, based on the schedule data, a context of presentation of audio output via each of the at least two wearable audio output devices, the context being one or more audio characteristics of a group comprising: (i) sound quality of the presentation; and (ii) a volume level of ambient sound. The controller associates, for each of the at least two wearable audio output devices, a respective ambient sound attenuation value that is designated as compatible with a range of sound quality and volume level of the context of presentation. The controller identifies a candidate wearable audio output device of the at least two wearable audio output devices that has an associated ambient sound attenuation value that is compatible with the context of presentation. The controller presents, via an output device, a recommendation to have the candidate wearable audio output device available to successfully present the audio output for the context of presentation of the audio output during a later scheduled time.

In one or more embodiments, the electronic device includes a communications subsystem by which the electronic device communicates with at least one second electronic device that also presents audio output via one or more of the at least one wearable audio output device. The controller may associate the electronic device and at least one second electronic device with a first user, the at least one second electronic device presenting second audio output via one or more of the at least one wearable audio output devices for listening by the first user. The controller may receive, via the communications subsystem from the at least one second electronic device, audio exposure data for audio exposure originating at the at least one second electronic device. The controller may determine the total time of the audio exposure to the user by aggregating audio exposure data originating at the electronic device and at the at least one second electronic device. In one or more particular embodiments, the controller may transmit, via the communications subsystem, audio exposure data originating at the electronic device to the at least one second electronic device to enable the at least one second electronic device to aggregate audio exposure originating at the electronic device and at the at least one second electronic device and to generate a subsequent alert in response to a second total time of audio exposure exceeding the audio exposure threshold.

Aspects of the present disclosure provide digital wellbeing management during use of wearable audio output devices that reduce or preclude air flow to ear canal(s) of a user who is listening to audio output. In one or more embodiments, the present disclosure may provide for determining usage of a short ranged wireless audio device for audio playback from more than one electronic devices by the same user. The present disclosure may provide for associating each usage of audio playback via the wearable audio device to the user using: (a) device sensors (e.g., camera, microphone) and device account information; (b) sensors on the wearable devices which helps determine device user; and (c) explicit confirmation by the user in the absence of user's identification. The present disclosure may provide for determining the type of the wearable audio device as one the following wearable categories: (a) wired/wireless; (b) open back/semi-open headphones; (c) bone conduction headphone/on ear headphones; (d) in-ear headphones/closed ear headphones. The present disclosure may provide for determining the usage of audio wearable device in an immersive mode (i.e., audio noise cancellation (ANC) or transparent mode). The present disclosure may provide for determining the audio volume level played during each playback. The present disclosure may provide for communicating between audio source devices and accumulating total listening time for each user across all the user's audio wearable devices. The present disclosure may provide for presenting periodic usage information to a user on a per audio source device basis as well as the wearable audio device basis along with audio volume level. The present disclosure may provide for presenting an alert/warning to the user if the total playback time (e.g., for one wearable audio output device or for all wearable audio output devices) is greater than a threshold in a given time period. The present disclosure may provide for offering to pause audio playback or offering playback to an alternative audio device that is better than the current one with regard to allowing more air flow to ear(s) of the user (e.g., over the ear headphones compared to in-ear). For over-the-ear headphones, air flow may depend on surface features such as a breathable surface versus a non-breathable surface. An amount of air captured between the headphone and an ear canal may also provide a different level of exposure.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical, and other changes may be made without departing from the spirit or scope of the present disclosure. The following detailed description is, therefore, not to be taken in a limiting sense, and the scope of the present disclosure is defined by the appended claims and equivalents thereof. Within the descriptions of the different views of the figures, similar elements can be provided with similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention. The description of the illustrative embodiments can be read in conjunction with the accompanying figures. Embodiments incorporating teachings of the present disclosure are shown and described with respect to the figures presented herein.

FIG. 1 presents a simplified functional block diagram of an electronic system that includes or is wholly provided by an electronic device, in which the features of the present disclosure are advantageously implemented for monitoring presentation of audio output via wearable audio output device(s) directly to ear(s) of a user. Wellbeing policies are executed to present alerts responsive to the accumulated usage. In one or more embodiments, the electronic device can include additional communications functionality as communication device 101 to operate as a mobile user device in communication environment 100. Throughout the disclosure, electronic device is interchangeably referred to as communication device 101. Communication device 101 can be one of a host of different types of devices, including but not limited to, a mobile cellular phone, satellite phone, or smart phone, a laptop, a netbook, an ultra-book, a networked smartwatch, or networked sports/exercise watch, and/or a tablet computing device or similar device that can include wireless communication functionality. As a device supporting wireless communication, communication device 101 can be utilized as, and also be referred to as, a system, device, subscriber unit, subscriber station, mobile station (MS), mobile, mobile device, remote station, remote terminal, user terminal, terminal, user agent, user device, a session initiation protocol (SIP) phone, a wireless local loop (WLL) station, a personal digital assistant (PDA), computer workstation, a handheld device having wireless connection capability, a computing device, or other processing devices.

In an example, communication device 101 is operated by user 102 to listen to audio output 104 via at least one wearable audio output device 106. Wearable audio output device 106 is worn so as to direct audio output personally to one user. Wearable audio output devices 106 are generally worn on at least one ear of user 102 or worn on a head of user 102 and positioned proximate or overtop of at least one ear of user 102. User 102 may own wearable audio device 106 or merely have permission to use wearable audio device 106. In an example, one wearable audio output device is depicted at time "$T_1$" as an in-ear wearable audio output device(s), such as earphones 106*a* that have a low air leakage value. Earphones 106*a* substantially reduce or wholly preclude airflow to ear(s) 108 of user 102. Prolong audio exposure to earphones 106*a* may be undesirable due to effects of the audio sound itself and/or increased moisture levels within the ear encouraging bacterial growth. Another audio output device is depicted at time "$T_2$" as an over-the-ear wearable audio output device, such as headphone 106*b*, which has a moderate air leakage value. Headphone 106*b* may reduce airflow to ear(s) 108 of user 102 to a lesser degree than earphones 106*a*. Sufficiently prolonged audio exposure to earphones 106*a* may be undesirable due to effects of the audio sound itself and/or increased moisture levels within the ear encouraging bacterial growth. Switching from earphone 106*a* to headphone 106*b* may enable a longer period of time of usage without detrimental effect. However, the higher air leakage value of headphone 106*b* may not be operatively appropriate in the presence of loud ambient noise 109.

Aspects of the present disclosure may be implemented across a digital wellbeing group 110 of devices, such as including communication device 101 and at least one second electronic device 112. Communication device 101 includes communications subsystem 114 that enables communication device 101 to connect or link over network 116, which includes node 118, to other devices within digital wellbeing group 110 (e.g., at least one second electronic device 112). Node 118 may represent a wireless access point, a cellular radio access network, a wired network interface, an over-the-air relay or repeater, or other communication link. Communication device 101 can communicatively couple to at least one third-party audio content provider 120 via network 116 to receive third-party audio content 122. Communication device 101 includes at least one user interface component 124 configured to receive user inputs (e.g., touch, gesture, sound) via one or more input device 126 and to present outputs (e.g., light, sound, vibration) via one or more output devices 128. In addition to earphones 106*a* and headphones 106*b*, an example of output device 128 is an air-gapped audio output device such as audio speaker 106*c*. Speaker 106*c* provide an alternative way of presenting audio output (other than wearable audio output devices (106*a* and 106*b*) that does not limit airflow to ear(s) 108 (i.e., has a high air leakage value). Although speaker 106*c* may not present an airflow restriction, speaker 106*c* may not be a viable alternative to a wearable audio output device (106*a*-106*b*). In an example, some locations may not be suitable for effective use of output device 128 for audio presentation due to presence of ambient noise 109 or proximity to other people.

In one or more embodiments, communication device 101 includes audio driver 129 configured to communicatively couple and transmit audio output to at least one wearable audio output device 106. Controller 130 is communicatively coupled to audio driver 129 to monitor presentation of audio output 104 via each of the at least one wearable audio output device 106 to obtain audio exposure data 132*a* originating at communication device 101. Controller 130 compares a total time of audio exposure to user 102 via each of at least one wearable audio output device 106 presenting audio output 104 with a corresponding audio exposure threshold within an exposure period of time. Controller 130 presents alert 134 via output device(s) 128 in response to the total time of audio exposure exceeding the audio exposure threshold. In an example, alert 134 is presented by wearable audio output device 106 that is currently worn by user 102. Alternatively, or in addition, alert 134 is visually presented by output device 128, which is a display. Alert 134 may provide a prompt to pause audio output 104. Controller 130 pauses the presentation of audio output 104 on a current one of at least one wearable audio output device 106, in response to receiving a corresponding input via input device 126 to pause or switch audio output device.

In one or more embodiments, communication device 101 communicates, via communications subsystem 114 with at least one second electronic device 112 that also presents audio output 104 via one or more of at least one wearable audio output device 106. Controller 130 associates, with a first user (102), communication device 101 and at least one second electronic device 112 as part of digital wellbeing group 1. At least one second electronic device 112 present second audio output via one or more of at least one wearable audio output devices 106 for listening by the first user (102). Controller 130 receives, via communications subsystem 114 from at least one second electronic device 112, audio exposure data 132*b* originating at second electronic device 112. Controller 130 determines the total time of the audio exposure to user 102 by aggregating audio exposure data 132*a*-132*b* originating at communication device 101 and at least one second electronic device 112. In one or more particular embodiments, controller 130 transmits, via communications subsystem 114, audio exposure data 132*a* originating at communication device 101 to at least one second electronic device 112 to enable at least one second electronic device 112 to aggregate audio exposure data 132*a*-132*b* originating respectively at communication device 101 and at least one second electronic device 112. The at least one second electronic device 112 is further enabled to generate a subsequent alert in response to a second total time of audio exposure exceeding the audio exposure threshold.

In one or more embodiments, controller 130 monitors audio power level of audio output 104. Controller 130 compares the audio power level to audio power threshold 136 contained in memory subsystem 138 of communication device 101. Controller 130 aggregates the audio exposure total based at least in part on the audio power level being above audio power threshold 136. In one or more embodiments, controller 130 maintains subtotal values for audio exposure duration for each of at least two wearable audio output devices 106 (e.g., earphones 106*a* and headphone 106*b*). Controller 130 identifies a respective air leakage value and audio exposure threshold for each wearable audio output device (106*a*-106*b*). Controller 130 compares each respective audio exposure threshold to the subtotal value for a corresponding wearable audio output device (106*a*-106*b*) during the exposure period of time. Controller 130 presents alert 134 via output device 128 to pause audio output 104 in response to the total time of audio exposure for any one of the at least two wearable audio output devices (106*a*-106*b*) exceeding the respective audio exposure threshold for the respective one of at least two wearable audio output devices (106*a*-106*b*).

In one or more embodiments, controller 130 maintains subtotal values for audio exposure duration for each of the at least two wearable audio output devices (106*a*-106*b*). Controller 130 identifies a respective air leakage value and audio exposure threshold for each wearable audio output device (106*a*-106*b*). Controller 130 compares the respective audio exposure threshold to the subtotal values during the exposure period of time. Controller 130 presents alert 134 via output device 128 to switch to another wearable audio output device 106 in response to the total time of audio exposure exceeding the respective audio exposure threshold for the respective one of two wearable audio output devices (106*a*-106*b*).

In one or more embodiments, communication device 101 includes memory subsystem 138 containing preset air leakage value 140 associated with a preset audio exposure threshold. In response to determining that two or more wearable audio output devices (106*a*-106*b*) having different air leakage values are used during the exposure period of time, controller 130 maintains subtotal values for audio exposure duration for each of wearable audio output devices (106*a*-106*b*). Controller 130 assigns a proportional weight to a respective duration of audio exposure for each of two or more wearable audio output devices (106*a*-106*b*) in relation to a ratio of the corresponding air leakage value to the preset air leakage value to normalize the respective durations. Controller 130 aggregates the weighted durations of audio exposure to a total audio exposure value. Controller 130 compares the total audio exposure value to the preset audio exposure threshold. Controller 130 presents alert 134 via output device 128 in response to the total time of audio exposure contributed by two or more wearable audio output devices (106*a*-106*b*) exceeding the preset audio exposure threshold.

Controller 130 includes processor subsystem 150, which includes one or more central processing units (CPUs) or data processors. Processor subsystem 150 can include one or more digital signal processors that can be integrated with data processor(s). Processor subsystem 150 can include other processors such as auxiliary processor(s) that may act as a low power consumption, always-on sensor hub for physical sensors. Controller 130 manages, and in some instances directly controls, the various functions and/or operations of communication device 101. These functions and/or operations include, but are not limited to including, application data processing, communication with second communication devices, navigation tasks, image processing, and signal processing. In one or more alternate embodiments, communication device 101 may use hardware component equivalents for application data processing and signal processing. For example, communication device 101 may use special purpose hardware, dedicated processors, general purpose computers, microprocessor-based computers, micro-controllers, optical computers, analog computers, dedicated processors and/or dedicated hard-wired logic.

In an example, a first wearable audio output device has an audio exposure threshold of 90 minute and a first subtotal of usage of 60 minutes. A second wearable audio output device has an audio exposure threshold of 180 minutes and a second subtotal value of usage of 60 minutes. To aggregate the subtotals in one scenario, the second subtotal is normalized based on the threshold ratios being 1:2. The second subtotal is weighted to 30 minutes and added to the first subtotal of 60 minutes for a total of 90 minutes to compare to the first exposure threshold of 90 minutes. The usage of the two wearable audio output devices meets the exposure threshold. Alternatively, the first subtotal of 60 minutes could be weighted to 120 minutes, added to the second subtotal of 60 minutes to total 180 minutes, which meets the second exposure threshold of 180 minutes.

In addition to communications subsystem 114, controller 130, and memory subsystem 138, communication device 101 may include data storage subsystem 144 and input/output (I/O) subsystem 146. To enable management by controller 130, system interlink 148 communicatively connects controller 130 with communications subsystem 114, memory subsystem 138, data storage subsystem 144 and I/O subsystem 146. System interlink 148 represents internal components that facilitate internal communication by way of one or more shared or dedicated internal communication links, such as internal serial or parallel buses. As utilized herein, the term "communicatively coupled" means that information signals are transmissible through various interconnections, including wired and/or wireless links, between the components. The interconnections between the components can be direct interconnections that include conductive transmission media or may be indirect interconnections that include one or more intermediate electrical components. Although certain direct interconnections (i.e., system interlink 148) are illustrated in FIG. 1, it is to be understood that more, fewer, or different interconnections may be present in other embodiments.

Controller 130 may include artificial intelligence (AI) modules for computation tasks. AI modules may include an artificial neural network, a decision tree, a support vector machine, Hidden Markov model, linear regression, logistic regression, Bayesian networks, and so forth. The AI modules can be individually trained to perform specific tasks and can be arranged in different sets of AI modules to generate different types of output.

Memory subsystem 138 stores program code 152 for execution by processor subsystem 150 to provide the functionality described herein. Program code 152 includes applications such as communication/media application 154 that provide audio output 104. Program code 152 may include digital wellbeing application 155 that tracks usage of wearable audio output devices 106, and include other applications 156. These applications/modules may be software or firmware that, when executed by controller 130, causes controller 130 to configure communication device 101 to provide functionality described herein.

In one or more embodiments, several of the described aspects of the present disclosure are provided via executable program code of applications executed by controller 130. In one or more embodiments, program code 152 may be integrated into a distinct chipset or hardware module as firmware that operates separately from executable program code. Portions of program code 152 may be incorporated into different hardware components that operate in a distributed or collaborative manner. Memory subsystem 138 further includes operating system (OS), firmware interface, such as basic input/output system (BIOS) or Uniform Extensible Firmware Interface (UEFI), and firmware, which also includes and may thus be considered as program code 152.

Program code 152 may access, use, generate, modify, store, or communicate computer data 160, such as audio power threshold 136 and preset air leakage value 140. Computer data 160 may incorporate "data" that originated as raw, real-world "analog" information that consists of basic facts and figures. Computer data 160 includes different forms of data, such as numerical data, images, coding, notes, and financial data. Computer data 160 may originate at communication device 101 or be retrieved from a remote device via communications subsystem 114. Communication device 101 may store, modify, present, or transmit computer data 160 such as audio exposure data 132*a*-132*b*. Computer data 160 may be organized in one of a number of different data structures. Common examples of computer data 160 include video, graphics, text, and images. Computer data 160 can also be in other forms of flat files, databases, and other data structures.

Data storage subsystem 144 of communication device 101 includes data storage device(s) 168. Controller 130 is communicatively connected, via system interlink 148, to data storage device(s) 168. Data storage subsystem 144 provides program code 152 and computer data 160 stored on nonvolatile storage that is accessible by controller 130. For example, data storage subsystem 144 can provide a selection of program code 152 and computer data 160. These applications can be loaded into memory subsystem 138 for execution/processing by controller 130. In one or more embodiments, data storage device(s) 168 can include hard disk drives (HDDs), optical disk drives, and/or solid-state drives (SSDs), etc. Data storage subsystem 144 of communication device 101 can include removable storage device(s) (RSD(s)) 170, which is received in RSD interface 172. Controller 130 is communicatively connected to RSD 170, via system interlink 148 and RSD interface 172. In one or more embodiments, RSD 170 is a non-transitory computer program product or computer readable storage device that may be executed by a processor associated with a user device such as communication device 101. In one or more embodiments, when executed by processor subsystem 150 of controller 130 associated with an electronic device, such as communication device 101, program code 152 enables and configures communication device 101 to provide functionality of the present disclosure. Controller 130 can access data storage device(s) 168 or RSD 170 to provision communication device 101 with program code 152 and computer data 160.

I/O subsystem 146 may include internal input devices 174 such as image capturing device(s) 175, microphone 176, and touch input devices 180 (e.g., screens, keys, or buttons). I/O subsystem 146 may include internal output devices 182 such as display 183, audio output devices 184, lights 186, and vibratory or haptic output devices 188. Input devices 126 and internal input devices 174 may create or modify computer data 160 associated with digital wellbeing application 155 such as schedule data 190, wearable audio output device inventory 192, and calendar 194.

In one or more embodiments, controller 130, via communications subsystem 114, performs multiple types of cellular over-the-air (OTA) or wireless communication, such as by using a Bluetooth connection or other wearable access network (PAN) connection. In an example, a user may wear a health monitoring device such as a smartwatch that is communicatively coupled via a wireless connection. In one or more embodiments, communications subsystem 114 includes a global positioning system (GPS) module that receives GPS broadcasts from GPS satellites to obtain geospatial location information. In one or more embodiments, controller 130, via communications subsystem 114, communicates via a wireless local area network (WLAN) link using one or more IEEE 802.11 WLAN protocols with an access point. In one or more embodiments, controller 130, via communications subsystem 114, may communicate via an OTA cellular connection with radio access networks (RANs). In an example, communication device 101, via communications subsystem 114, connects via RANs of a terrestrial network that is communicatively connected to a network server.

In one or more embodiments, an electronic device, such as communication device 101, includes audio driver 129 that is configured to communicatively couple serially to at least two wearable audio output devices (106*a*-106*b*). Each wearable audio output device (106*a*-106*b*) has a different allowed airflow and ambient sound attenuation level. Controller 130 of communication device 101 is communicatively coupled to audio driver 129. Controller 130 identifies schedule data associated with presentation of audio output. The controller determines, based on schedule data 190 in memory device 101, a context of presentation of audio output 104 via each of at least two wearable audio output devices (106*a*-106*b*). The context includes one or more audio characteristics of a group comprising: (i) sound quality of the presentation; and (ii) a volume level of ambient sound. Controller 130 associates, for each of the at least two wearable audio output devices (106*a*-106*b*), a respective ambient sound attenuation value that is designated as compatible with a range of sound quality and volume level of the context of presentation. Controller 130 identifies a candidate wearable audio output device (106*a*-106*b*) of the at least two wearable audio output devices (106*a*-106*b*) that has an associated ambient sound attenuation value that is compatible with the context of presentation. Controller 130 presents, via output device 128, a recommendation to have the candidate wearable audio output device (106*a*-106*b*) available to successfully present audio output 104 for the context of presentation of audio output 104 during a later scheduled time.

In one or more embodiments, controller 130 determines, based on schedule data 190, an expected duration of the presentation of the audio output. Controller 130 associates, for each of the at least two wearable audio output devices (106*a*-106*b*), a respective air leakage value and duration threshold related to an airflow level that passes to at least one ear of a wearer (user 102). A duration of the exposure to reduced airflow level in at least one ear 108 is related to risk level for moisture-related bacterial growth in the at least one ear 108. The correlation may be direct or indirect. The relationship may be linear or nonlinear and may vary based on ambient temperature and humidity conditions. The correlation may depend on the susceptibility of the particular user. A respective duration threshold for a recommended limit on use during a period of time is assigned to each wearable audio output device based on the air leakage value and the corresponding acceptable increase in risk due to exposure as a function of duration. Controller 130 identifies the candidate wearable audio output device (106*a*-106*b*) of the at least two wearable audio output devices (106*a*-106*b*) that further has a corresponding duration threshold that does not exceed the duration of the exposure to the reduced airflow.

In one or more embodiments, prior to identifying schedule data 190 associated with presentation of the audio output, controller 130 determines a location of communication device 101. Controller 130 monitors the ambient sound level received at a microphone of one of communication device 101 and a current in-use wearable audio output device (106*a*-106*b*) from among the at least two wearable audio output devices (106*a*-106*b*). Controller 130 records the location with the corresponding ambient sound level as location/sound data 196 that augments or is part of schedule data 190. Subsequent determination of the ambient sound level associated with schedule data 190 is based on identifying that the presentation of the audio output is being scheduled at the location that is characterized in location/sound data 196.

In one or more embodiments, controller 130 determines the sound quality of the context of the presentation of audio output based on identifying a respective type of media scheduled to be presented. Controller 130 associates the sound quality with a compatible volume differential between the volume level of the audio output and the ambient sound level, as reduced by the associated ambient sound attenuation value.

In one or more embodiments, communication device 101 further includes communications subsystem 114 by which communication device 101 communicatively couples to the at least two wearable audio output devices (106*a*-106*b*). Controller 130 maintains wearable output device (WAOD) inventory 192 (FIG. 1). Controller 130 identifies and presents a marketing channel from which a user can acquire the candidate wearable audio output device (106*a*-106*b*) in response to not identifying a suitable wearable audio output device (106*a*-106*b*) in WAOD inventory 192.

In one or more embodiments, in identifying the schedule data associated with presentation of the audio output, controller 130 accesses one or more calendar entries in calendar 194. The calendar entries are associated with communication device 101 that is assigned to user 102 (FIG. 1). Controller 130 determines the context of presenting the audio output for each of the one or more calendar entries based on information contained in the calendar entry indicating one or more of: (i) a location of communication device 101; and (ii) a type of audio content to be presented.

In one or more embodiments, prior to identifying the schedule data associated with presentation of the audio output, controller 130 tracks one or more of time of day and day of week of presentation of audio output along with associated context. Controller 130 identifies a recurring pattern corresponding to a schedule of the presentation of audio output. Controller 130 records the schedule with the associated context as schedule data 190.

Figure 2:
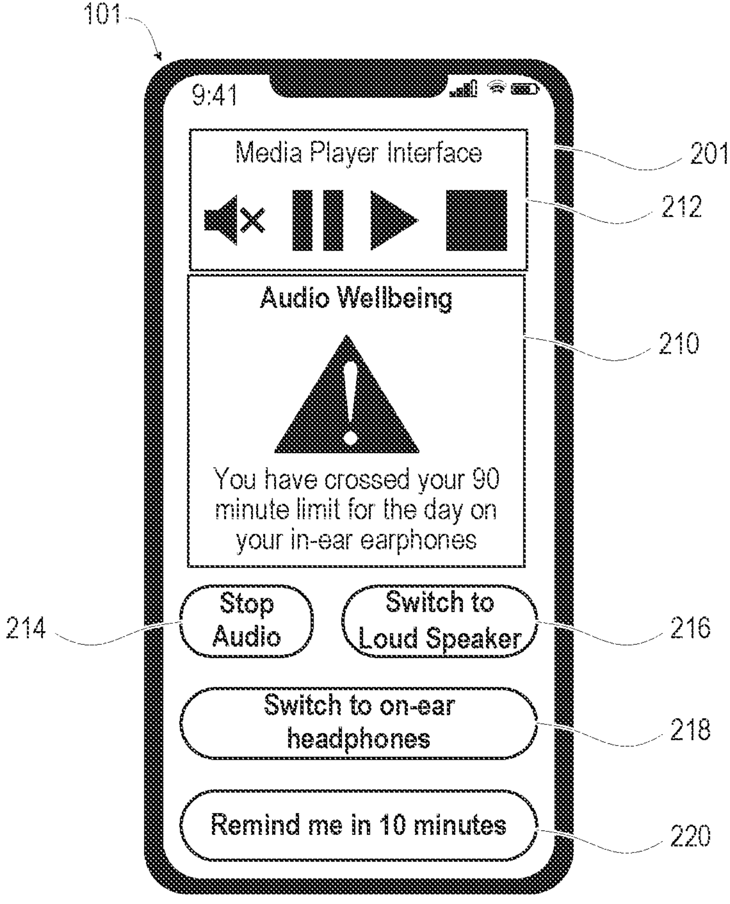
FIG. 2 is a front view of a touch display of the electronic device presenting a notification that the user has exceeded a duration threshold for using wearable audio output devices and enabling selectable user response options, according to one or more embodiments.

FIG. 2 is a front view of touch display 201 of communication device 101 presenting notification GUI 210 for digital wellbeing management. In an example, touch display 201 is also visually presenting media playback application 212 that generates audio for aurally presenting by wearable audio output device (106*a*-106*b*). In an example, notification GUI 210 is triggered by a duration threshold of 90 minutes for the day for in-ear earphones usage. In an example, notification GUI 210 includes stop audio control 214 that prompts and triggers stopping audio output. In an example, notification GUI 210 includes switch to loudspeaker control 216 that prompts and triggers a switch to a loud speaker to avoid use of a wearable audio output device. In an example, notification GUI 210 includes switch to on-ear headphone control 218 to prompt and trigger a switch to an on-ear headphone with increased air leakage. In an example, notification GUI 210 includes remind me in 10 minutes control 220 to provide a duration threshold for re-presenting notification GUI 210.

Figure 3:
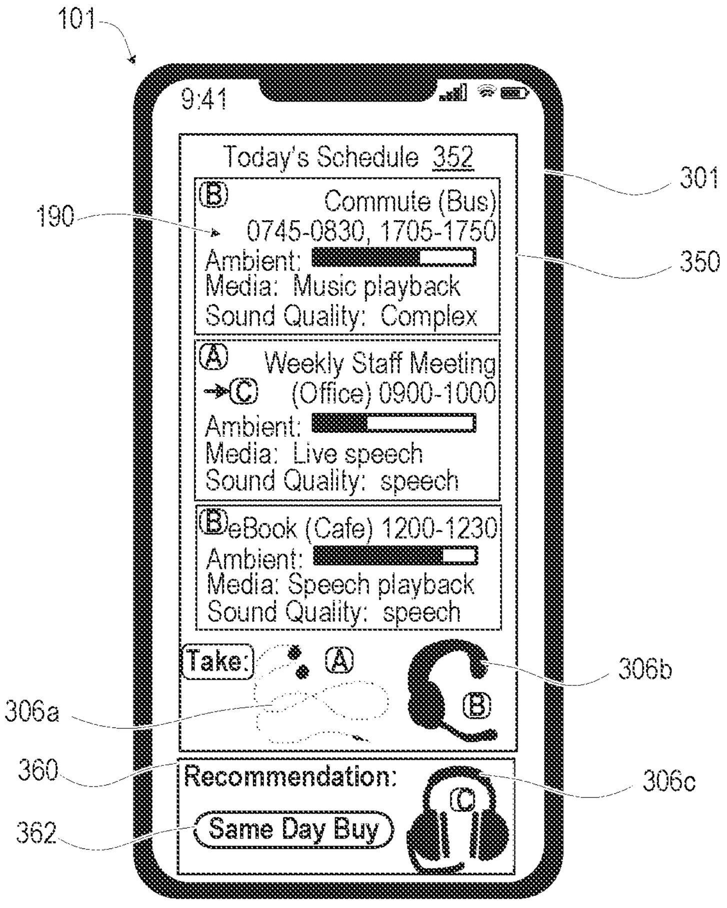
FIG. 3 is a second view of the touch display of the electronic device presenting a notification of recommendations for wearable audio output devices to take and/or to buy in preparation for scheduled use, according to one or more embodiments.

FIG. 3 is a second view of touch display 301 of communication device 101 presenting notification 350 including today's schedule 352 that includes recommendations to take first and second wearable audio output devices 306*a*-306*b* and to buy third wearable audio output device 306*c* in preparation for scheduled use for digital wellbeing management. In an example, schedule data 190 for today includes morning and afternoon commutes by bus learned by communication device 101 based on a recurring pattern of playing music in a moderate noisy public bus. The type of media is music that requires high audio performance for satisfactory quality. Schedule data 190 includes a calendar entry for a weekly staff meeting. Communication device 101 determines that two-way live speech will occur during the meeting based either on the calendar entry itself or based on a pattern of communication that has occurred during previous weekly staff meetings. Schedule data 190 includes lunch in the cafeteria that is expected to include playing of an electronic audiobook ("eBook")

Candidate wearable audio output devices for the scheduled use include first wearable audio output device 306*a* ("A") that is an in-ear (earphone) device with low ambient sound attenuation and low sound quality performance. Noise cancellation by communication device 101 may be required for satisfactory performance during use on a public bus or in a cafeteria. Second wearable audio output device 306*b* ("B") is over-one-ear headset (headphone) device with microphone with low ambient sound attenuation and moderate sound quality performance. Third wearable audio output device 306*c* ("C") is an over-ear (headphone) device with microphone with high ambient sound attenuation and high sound quality performance. Wearable audio output devices are deemed accessible if available for immediate use. Wearable audio output devices are deemed retrievable if associated with the electronic device based on (i) prior purchases; (ii) prior connections to the electronic device; and (iii) user inputs indicating prior possession. Retrievable wearable audio output devices may be at another location or be currently proximate to electronic device in a noncommunicative state.

In an example, WAOD inventory 192 (FIG. 1) identifies first and second wearable audio output devices 306*a*-306*b* as being accessible to user 102 and meeting the performance and digital wellbeing requirements for the context of the scheduled use (FIG. 1). In response to determining that third wearable audio output devices 306*c* also fully meet the performance and digital wellbeing requirements for the context of the scheduled use, communication device 101 presents recommendation 360 identifying third wearable audio output device 306*c* for purchase, with selectable buy control 362. In an example, second wearable audio output device 306*b* may be satisfactory for use during commuting and while in the cafeteria but lack a microphone needed for two-way communication. First wearable audio output device 306*a* includes a microphone but the in-ear speaker may be less than satisfactory due to the duration of blocking airflow to the ears 108 of user 102 (FIG. 1). Third wearable audio output device 306*c* may not be required to attenuate ambient sounds due to a relatively quiet context of the office. Depending on how tightly the headphone conforms to the ear, the second wearable audio output device 306*b* may provide more airflow to the right ear than first wearable audio output device 306*a*. Second wearable audio output device 306*b* does not restrict airflow to the left air. Second wearable audio output device 306*b* may be usable in a reverse configuration covering the left ear and leaving the right ear exposed. Notification 350 may present a prompt to switch second wearable audio output device 306*b* to extend duration of exposure based on subtotals per ear.

Figure 4:
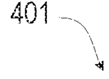
FIG. 4 is an example table of airflow leakage, sound attenuation, and sound quality characteristics of the first, second and third wearable audio output device, according to one or more embodiments.

FIG. 4 presents table 401 of example characteristics used for digital wellbeing management for wearable audio output devices (e.g., earphones, headphones). First wearable audio output devices 306*a* has a first airflow leakage value of 5% (i.e., 95% reduction from not wearing anything over or in the ear), a first sound attenuation value of 30% (i.e., 30% of the ambient sound is removed), and first sound quality characteristics of 35% (i.e., the reproduced frequency/amplitude has a 35% correlation with the original). Second wearable audio output devices 306*b* has a second airflow leakage value of 50% for the right ear and 100% for the left ear, a second sound attenuation value of 50% for the right ear and 0% for the left ear, and a second sound quality characteristics of 55% for the right ear and 0% for the left ear. Third wearable audio output devices 306*c* has a third airflow leakage value of 60%, a third sound attenuation value of 80%, and a third sound quality characteristics of 90%. In an example, a range of 0-35% is deemed "Low", a range of 36-70% is deemed "Moderate", and a range of 71-100% is deemed "High".

Figure 5:
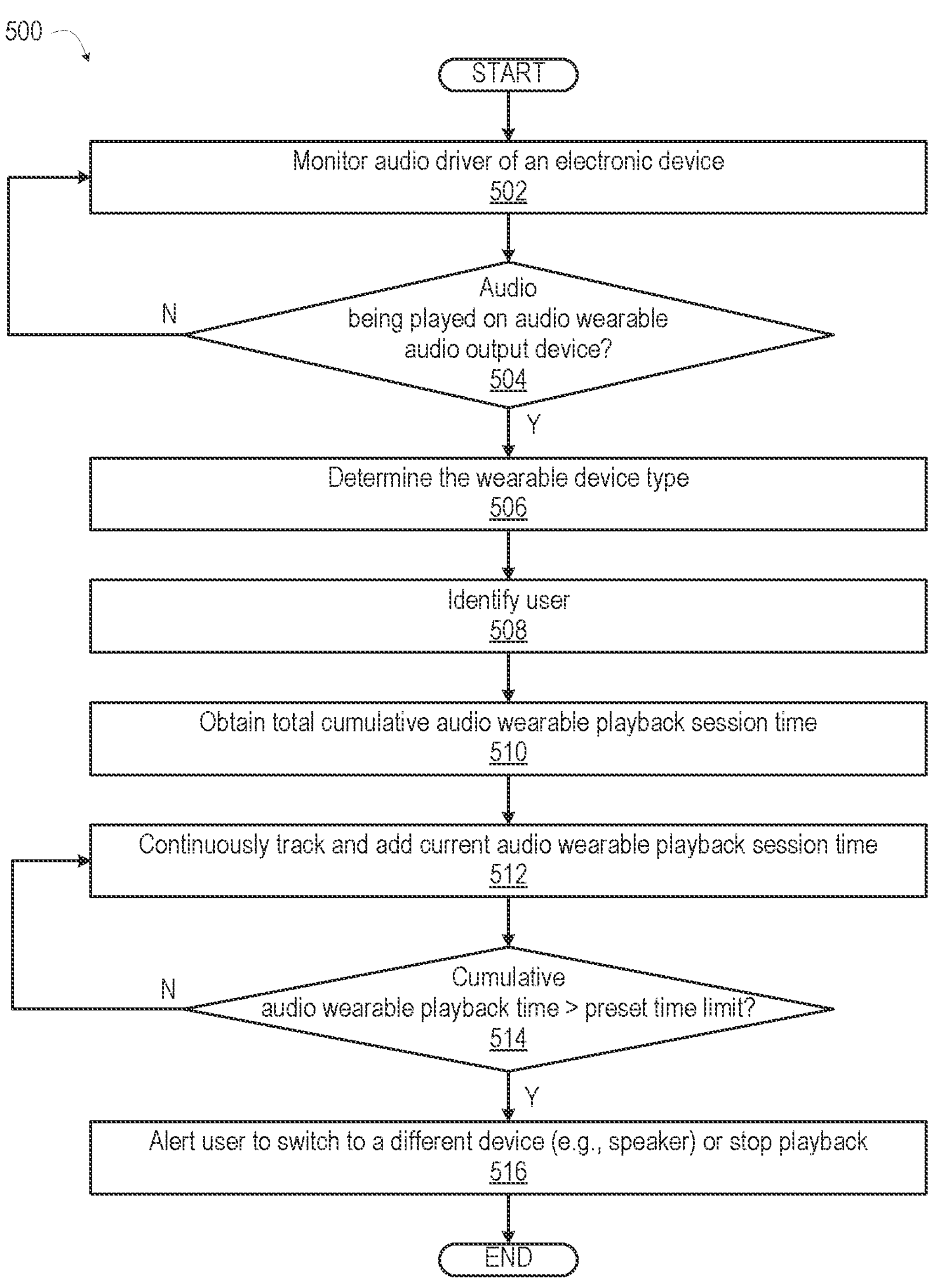
FIG. 5 is a flow diagram presenting an example method of digital wellbeing management based on context of use of connected short ranged wearable device(s), according to one or more embodiments.
Figure 6:
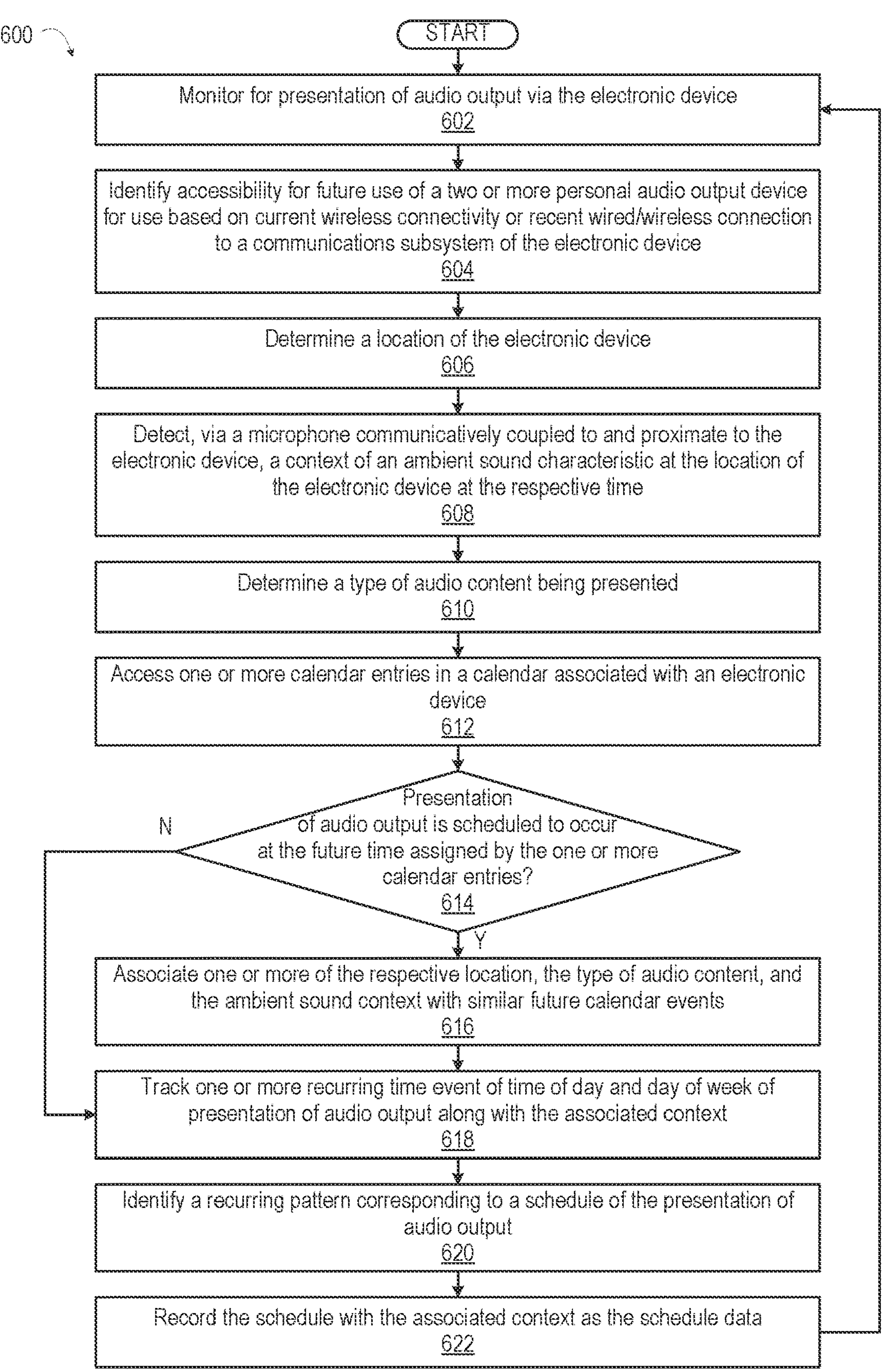
FIG. 6 is a flow diagram of a method of inferring a schedule and context of expected future use of wearable audio output devices, according to one or more embodiments.

FIG. 5 is a flow diagram presenting example method 500 of providing digital wellbeing management based on context of use of connected short-range wearable audio output device(s). FIG. 6 is a flow diagram presenting example method 600 of inferring a schedule and context of expected future use of wearable audio output devices. FIG. 7 is a flow diagram of method 700 of recommending an appropriate wearable audio output device for a context of a scheduled use. The descriptions of method 500 (FIG. 5), method 600 (FIG. 6), and method 700 (FIG. 7) are provided with general reference to the specific components illustrated within the preceding FIGS. 1-4. Specific components referenced in method 500 (FIG. 5), method 600 (FIG. 6), and method 700 (FIG. 7) may be identical or similar to components of the same name used in describing preceding FIGS. 1-4. In one or more embodiments, controller 130 (FIG. 1) configures communication device 101 (FIG. 1) or a similar computing device to provide the described functionality of method 500 (FIG. 5), method 600 (FIG. 6), and method 700 (FIG. 7).

With reference to FIG. 5, method 500 includes monitoring (by the processor) the audio driver of an electronic device (block 502). Method 500 includes determining whether audio is being played on a wearable audio output device (decision block 504). Method 500 includes determining the wearable device type (block 506). Method 500 includes identifying the user of the wearable audio output device (block 508). In an example, the electronic device authenticates a user for access to a user interface via one or more of face recognition, voice recognition, pass code entry (e.g., verbal, touch, or gesture input), and/or fingerprint/palmprint recognition. The authenticated user is then associated with the subsequent use of the device and the wearable audio output device. Method 500 includes obtaining (or determining by summation) total cumulative wearable audio device playback session time (block 510). Method 500 includes continuously tracking and adding current audio wearable playback session time (block 512). Method 500 includes determining whether the cumulative audio wearable playback time is greater than a preset time limit (decision block 514). In response to determining that the cumulative audio wearable playback time is not greater (i.e., less than or equal to) than a preset time limit, method 500 returns to block 512. In response to determining that the cumulative audio wearable playback time is greater than a preset time limit, method 500 includes alerting the user to switch to a different device (e.g., speaker) or to stop playback (block 516). Then method 500 ends.

With reference to FIG. 6, method 600 includes monitoring for presentation of audio output via the electronic device (block 602). Method 600 includes identifying accessibility for future use of two or more wearable audio output devices for use based on current wireless connectivity or recent wired/wireless connection to a communications subsystem of the electronic device (block 604). Method 600 includes determining a location of the electronic device (block 606). Method 600 includes detecting, via a microphone communicatively coupled to and proximate to the electronic device, a context of an ambient sound characteristic at the location of the electronic device (block 608). Method 600 includes determining a type of audio content being presented (block 610). Method 600 includes accessing one or more calendar entries in a calendar associated with an electronic device (block 612). Method 600 includes determining whether presentation of audio output is scheduled to occur at a future time assigned by the one or more calendar entries (decision block 614). In response to determining that presentation of audio output is scheduled to occur at the future time assigned by the one or more calendar entries, method 600 includes associating one or more of the respective location, the type of audio content, and the ambient sound context with similar future calendar events (block 616).

In response to determining that presentation of audio output is occurring at a respective time assigned by the one or more calendar entries in decision block 614 or after block 616, method 600 includes tracking one or more recurring time event of a group include: (i) time of day; (ii) day of week; and (iii) day of year of presentation of audio output along with the associated context (block 618). Method 600 includes identifying a recurring pattern (e.g., daily, weekly, monthly, or yearly) corresponding to a schedule of the presentation of audio output (block 620). Method 600 includes recording the schedule with the associated context as the schedule data (block 622). Then method 600 returns to block 602.

With reference to FIG. 7, method 700 includes monitoring a context of presentation of audio output to learn one or more presentation characteristics of a group comprising: (i) ambient characteristics; (ii) locations of presentation; (iii) patterns of presentation behavior; and (iv) types of media presented (block 702). Method 700 includes inferring schedule data from the one or more presentation characteristics (block 704). Method 700 includes identifying accessibility for future use of two or more wearable audio output devices, based on current wireless connectivity or recent wired/wireless connection to a communications subsystem of the electronic device (block 706). Method 700 includes identifying schedule data associated with presentation of audio output by the electronic device (block 708). Method 700 includes determining, based on the schedule data, a context of presentation of audio output, the context being one or more audio characteristics of a group comprising: (i) sound quality of the presentation; and (ii) a volume level of ambient sound (block 710). Method 700 includes associating, for each of at least two wearable audio output devices, a respective allowed airflow and a respective ambient sound attenuation level (block 712). Method 700 includes associating, for each of the at least two wearable audio output devices, a respective ambient sound attenuation value that is designated as compatible with a range of sound quality and volume level of the context of presentation (block 714). Method 700 includes selecting a subset of the candidate wearable audio output devices for air leakage value and a corresponding duration threshold that does not exceed the duration of the exposure to the reduced airflow to mitigate risks of reduced air flow to ear canal(s) of the user (block 716). Method 700 includes determining whether a candidate wearable audio output device currently is accessible to the user in the user inventory based on (i) prior purchases; (ii) prior connections to the electronic device; and (iii) user inputs indicating prior possession (decision block 718). In response to determining that a candidate wearable audio output device currently is accessible to the user, method 700 includes presenting, via an output device, a recommendation to have the candidate wearable audio output device available to successfully present the audio output for the context of presentation of the audio output during a scheduled time (block 720). Then method 700 ends. In response to determining that a candidate wearable audio output device currently is not accessible to the user, method 700 includes identifying and presenting a marketing channel to acquire the candidate wearable audio output device (block 722). Then method 700 ends.

In one or more embodiments, method 700 includes determining, based on the schedule data, an expected duration of the presentation of the audio output. Method 700 includes associating, for each of the at least two wearable audio output devices, a respective air leakage value related to an airflow level that passes to at least one ear of a wearer. A duration of exposure to a reduction in the airflow level is related to a risk level for moisture-related bacterial growth in the at least one ear. Method 700 includes identifying the candidate wearable audio output device of the at least two wearable audio output devices that has a corresponding duration threshold that does not exceed the duration of the exposure to the reduced airflow.

In one or more embodiments, method 700 includes determining the sound quality of the context of the presentation of audio output based on identifying a respective type of media scheduled to be presented. Method 700 includes associating the sound quality with a compatible volume differential between a volume level of the audio output and the ambient sound level as reduced by the associated ambient sound attenuation value.

In one or more embodiments, method 700 includes identifying and presenting a marketing channel to acquire the candidate wearable audio output device in response to not identifying a suitable wearable audio output device that is connectable, via the communications subsystem, to the electronic device.

In one or more embodiments, method 700 includes identifying a user inventory of wearable audio output devices based on one or more input from a group comprising: (i) prior purchases; (ii) prior connections to the electronic device; and (iii) user inputs indicating prior possession. In response to not identifying a candidate wearable audio output device among one or more wearable audio output device in the user inventory that has the associated ambient sound attenuation value that is compatible with the context of presentation, method 700 includes identifying and presenting a marketing channel for the user to acquire the candidate wearable audio output device.

In one or more embodiments, method 700 includes identifying the schedule data associated with presentation of the audio output by: (i) accessing one or more calendar entries in a calendar associated with the electronic device; and (ii) determining the context of presenting the audio output for each of the one or more calendar entries based on information contained in the calendar entry indicating one or more of: (a) a location of the electronic device during presentation of the audio content; and (b) a type of audio content to be presented.

Aspects of the present innovation are described above with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

While the innovation has been described with reference to exemplary embodiments, it will be understood by those skilled in the art that various changes may be made, and equivalents may be substituted for elements thereof without departing from the scope of the innovation. In addition, many modifications may be made to adapt a particular system, device, or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprise" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description but is not intended to be exhaustive or limited to the innovation in the form disclosed. Many modifications and variations will be apparent to those of ordinary skill in the art without departing from the scope and spirit of the innovation. The embodiments were chosen and described in order to best explain the principles of the innovation and the practical application, and to enable others of ordinary skill in the art to understand the innovation for various embodiments with various modifications as are suited to the particular use contemplated.

What is claimed is:

1. An electronic device comprising:

an audio driver configured to communicatively couple serially to at least two wearable audio output devices, each having a different allowed airflow and ambient sound attenuation level; and a controller communicatively coupled to the audio driver, and which:

identifies schedule data associated with presentation of audio output, the schedule data comprising at least a time of day corresponding to an upcoming activity, event, or location and at which presentation of audio output from the electronic device will occur;

determines, based on the schedule data, a context of presentation of audio output via each of the at least two wearable audio output devices, the context being one or more audio characteristics of a group comprising: (i) sound quality of the presentation; and (ii) a volume level of ambient sound;

associates, for each of the at least two wearable audio output devices, a respective ambient sound attenuation value that is designated as compatible with a range of sound quality and volume level of the context of presentation;

identifies a candidate wearable audio output device of the at least two wearable audio output devices that has an associated ambient sound attenuation value that is compatible with the context of presentation; and presents, via an output device, a recommendation to have the candidate wearable audio output device available to successfully present the audio output for the context of presentation of the audio output during a future scheduled time.

2. The electronic device of claim 1, wherein, in presenting the recommendation to have the candidate wearable audio output device available, the controller:

identifies a marketing channel to acquire the candidate wearable audio output device; and presents, via the output device, a link to the marketing channel.

3. The electronic device of claim 1, wherein the controller:

determines, based on the schedule data, an expected duration of the presentation of the audio output;

associates, for each of the at least two wearable audio output devices, a respective air leakage value related to an airflow level that passes to at least one ear of a wearer, a duration of exposure to a reduction in the airflow level being related to risk level for moisture-related bacterial growth in the at least one ear; and identifies the candidate wearable audio output device of the at least two wearable audio output devices that further has a corresponding duration threshold that does not exceed the duration of the exposure to the reduction in the airflow.

4. The electronic device of claim 1, wherein the controller:

prior to identifying the schedule data associated with presentation of the audio output:

determines a location of the electronic device;

monitors the ambient sound level received at a microphone of one of the electronic device and a current in-use wearable audio output device from among the at least two wearable audio output devices; and records the location and the ambient sound level as the schedule data for subsequent access, wherein a subsequent determination of the ambient sound level associated with the schedule data is based on identifying that the presentation of the audio output is being scheduled at the location.

5. The electronic device of claim 1, wherein the controller:

determines the sound quality of the context of the presentation of audio output based on identifying a respective type of media scheduled to be presented; and associates the sound quality with a compatible volume differential between a volume level of the audio output and the ambient sound level as reduced by the associated ambient sound attenuation value.

6. The electronic device of claim 1, wherein the controller:

identifies a user inventory of wearable audio output devices based on one or more input from a group comprising: (i) prior purchases; (ii) prior connections to the electronic device; and (iii) user inputs indicating prior possession; and in response to not identifying a candidate wearable audio output device among one or more wearable audio output device in the user inventory that has the associated ambient sound attenuation value that is compatible with the context of presentation, identifies and presents a marketing channel to acquire the candidate wearable audio output device.

7. The electronic device of claim 1, wherein, in identifying the schedule data associated with presentation of the audio output, the controller:

accesses one or more calendar entries in a calendar associated with the electronic device; and determines the context of presenting the audio output for each of the one or more calendar entries based on information contained in the calendar entry indicating one or more of: (i) a location of the electronic device; and (ii) a type of audio content to be presented.

8. The electronic device of claim 1, wherein, prior to identifying the schedule data associated with presentation of the audio output, the controller:

tracks one or more of time of day and day of week of presentation of audio output along with associated context;

identifies a recurring pattern corresponding to a schedule of the presentation of audio output; and records the schedule with the associated context as the schedule data.

9. A method comprising:

identifying schedule data associated with presentation of audio output by an electronic device, the schedule data comprising at least a time of day corresponding to an upcoming activity, event, or location and at which presentation of audio output from the electronic device will occur;

determining, based on the schedule data, a context of presentation of audio output, the context being one or more audio characteristics of a group comprising: (i) sound quality of the presentation; and (ii) a volume level of ambient sound;

associating, for each of at least two wearable audio output devices, a respective allowed airflow and a respective ambient sound attenuation level;

associating, for each of the at least two wearable audio output devices, a respective ambient sound attenuation value that is designated as compatible with a range of sound quality and volume level of the context of presentation;

identifying a candidate wearable audio output device of the at least two wearable audio output devices that has an associated ambient sound attenuation value that is compatible with the context of presentation; and presenting, via an output device, a recommendation to have the candidate wearable audio output device available to successfully present the audio output for the context of presentation of the audio output during a future scheduled time.

10. The method of claim 9, wherein presenting the recommendation to have the candidate wearable audio output device available further comprises:

identifying a marketing channel to acquire the candidate wearable audio output device; and presenting, via the output device, a link to the marketing channel.

11. The method of claim 9, further comprising:

determining, based on the schedule data, an expected duration of the presentation of the audio output;

associating, for each of the at least two wearable audio output devices, a respective air leakage value related to an airflow level that passes to at least one ear of a wearer, a duration of exposure to a reduction in the airflow level being related to risk level for moisture-related bacterial growth in the at least one ear; and identifying the candidate wearable audio output device of the at least two wearable audio output devices that further has a corresponding duration threshold that does not exceed the duration of the exposure to the reduction in the airflow.

12. The method of claim 9, further comprising:

prior to identifying the schedule data associated with presentation of the audio output:

determining a location of the electronic device;

monitoring the ambient sound level received at a microphone of one of the electronic device and a current in-use wearable audio output device from among the at least two wearable audio output devices; and recording the location and the ambient sound level as the schedule data for subsequent access, wherein a subsequent determination of the ambient sound level associated with the schedule data is based on identifying that the presentation of the audio output is being scheduled at the location.

13. The method of claim 9, further comprising:

determining the sound quality of the context of the presentation of audio output based on identifying a respective type of media scheduled to be presented; and associating the sound quality with a compatible volume differential between a volume level of the audio output and the ambient sound level as reduced by the associated ambient sound attenuation value.

14. The method of claim 9, further comprising:

identifying a user inventory of wearable audio output devices based on one or more input from a group comprising: (i) prior purchases; (ii) prior connections to the electronic device; and (iii) user inputs indicating prior possession; and in response to not identifying a candidate wearable audio output device among one or more wearable audio output device in the user inventory that has the associated ambient sound attenuation value that is compatible with the context of presentation, identifying and presenting a marketing channel to acquire the candidate wearable audio output device.

15. The method of claim 9, wherein identifying the schedule data associated with presentation of the audio output further comprises:

accessing one or more calendar entries in a calendar associated with the electronic device; and determining the context of presenting the audio output for each of the one or more calendar entries based on information contained in the calendar entry indicating one or more of: (i) a location of the electronic device; and (ii) a type of audio content to be presented.

16. The method of claim 9, further comprising:

prior to identifying the schedule data associated with presentation of the audio output:

tracking one or more of time of day and day of week of presentation of audio output along with the associated context;

identifying a recurring pattern corresponding to a schedule of the presentation of audio output; and recording the schedule with the associated context as the schedule data.

17. A computer program product comprising:

a computer readable storage device; and program code on the computer readable storage device that when executed by a processor associated with an electronic device, the program code enables the electronic device to provide functionality of:

identifying schedule data associated with presentation of audio output by the electronic device, the schedule data comprising at least a time of day corresponding to an upcoming activity, event, or location and at which presentation of audio output from the electronic device will occur;

determining, based on the schedule data, a context of presentation of audio output, the context being one or more audio characteristics of a group comprising: (i) sound quality of the presentation; and (ii) a volume level of ambient sound;

associating, for each of at least two wearable audio output devices, a respective allowed airflow and a respective ambient sound attenuation level;

associating, for each of the at least two wearable audio output devices, a respective ambient sound attenuation value that is designated as compatible with a range of sound quality and volume level of the context of presentation;

identifying a candidate wearable audio output device of the at least two wearable audio output devices that has an associated ambient sound attenuation value that is compatible with the context of presentation; and presenting, via an output device, a recommendation to have the candidate wearable audio output device available to successfully present the audio output for the context of presentation of the audio output during a future scheduled time.

18. The computer program product of claim 17, wherein the program code enables the electronic device to provide functionality of presenting the recommendation to have the candidate wearable audio output device available by:

identifying a marketing channel to acquire the candidate wearable audio output device; and presenting, via the output device, a link to the marketing channel.

19. The computer program product of claim 17, wherein the program code enables the electronic device to provide functionality of:

determining, based on the schedule data, an expected duration of the presentation of the audio output;

associating, for each of the at least two wearable audio output devices, a respective air leakage value related to an airflow level that passes to at least one ear of a wearer, a duration of exposure to a reduction in the airflow level being related to risk level for moisture-related bacterial growth in the at least one ear; and identifying the candidate wearable audio output device of the at least two wearable audio output devices that further has a corresponding duration threshold that does not exceed the duration of the exposure to the reduction in the airflow.

20. The computer program product of claim 17, wherein the program code enables the electronic device to provide functionality of:

prior to identifying the schedule data associated with presentation of the audio output:

determining a location of the electronic device;

monitoring the ambient sound level received at a microphone of one of the electronic device and a current in-use wearable audio output device from among the at least two wearable audio output devices; and recording the location and the ambient sound level as the schedule data for subsequent access, enabling determination of the ambient sound level associated with the schedule data based on identifying that the presentation of the audio output is being scheduled at the location.

* * * * *